US008205526B2

(12) United States Patent
Dombroski

(10) Patent No.: US 8,205,526 B2

(45) Date of Patent: Jun. 26, 2012

(54) PRESSURIZED HUB SYSTEM

(76) Inventor: Henry Dombroski, Boynton Beach, FL (US)

( * ) Notice: Subject to any disclaimer, the term of this patent is extended or adjusted under 35 U.S.C. 154(b) by 665 days.

(21) Appl. No.: 12/429,889

(22) Filed: Apr. 24, 2009

(65) Prior Publication Data

US 2009/0266647 A1 Oct. 29, 2009

Related U.S. Application Data

(63) Continuation-in-part of application No. 11/735,131, filed on Apr. 13, 2007, now Pat. No. 7,740,036, which is a continuation-in-part of application No. 10/699,565, filed on Oct. 30, 2003, now Pat. No. 7,226,133, which is a continuation-in-part of application No. 10/376,756, filed on Feb. 28, 2003, now Pat. No. 7,125,084.

(51) Int. Cl.
*F16C 13/00* (2006.01)

(52) U.S. Cl. ................. 74/587; 74/544; 74/546; 74/589

(58) Field of Classification Search .................. 384/543, 384/544, 546, 586, 587, 589; 492/4, 5, 47, 492/60
See application file for complete search history.

(56) References Cited

U.S. PATENT DOCUMENTS

| | | | | |
|---|---|---|---|---|
| 2,612,931 | A | 10/1952 | Orlicki | |
| 3,064,982 | A | 11/1962 | Stephens | |
| 3,077,948 | A | 2/1963 | Law | |
| 3,122,374 | A | 2/1964 | McGahan | |
| 3,169,809 | A | 2/1965 | Pendleton | |
| 3,226,162 | A | 12/1965 | Eberle | |
| 3,330,563 | A | 7/1967 | DePuydt et al. | |
| 3,460,874 | A | 8/1969 | Johnson | |
| 3,609,066 | A | 9/1971 | Wegmann | |
| 3,649,080 | A | 3/1972 | Molinare | |
| 3,719,159 | A | 3/1973 | Davis | |
| 3,785,706 | A | 1/1974 | Vangalis | |
| 3,955,852 | A | 5/1976 | DePuydt et al. | |
| 4,027,743 | A | 6/1977 | Deller et al. | |
| 4,106,816 | A | 8/1978 | August | |
| 4,172,620 | A | 10/1979 | Marti | |
| 4,190,133 | A | 2/1980 | Ploeger | |
| 4,262,978 | A | 4/1981 | Everett | |
| 4,310,014 | A | 1/1982 | Parker | |
| 4,324,114 | A | 4/1982 | Durham | |
| 4,489,988 | A | 12/1984 | Robbins | |
| 4,524,917 | A | 6/1985 | Williams | |
| 4,557,526 | A | 12/1985 | Smith | |
| 4,730,656 | A | 3/1988 | Goodell et al. | |
| 4,924,697 | A | 5/1990 | Hunt et al. | |
| 4,981,182 | A | 1/1991 | Dysart | |
| 5,024,345 | A | 6/1991 | Deweerdt | |
| 5,054,511 | A | 10/1991 | Tuan et al. | |
| 5,054,859 | A | 10/1991 | Goettker | |
| 5,081,759 | A * | 1/1992 | Schiel | 492/20 |
| 5,098,168 | A | 3/1992 | Johnson | |
| 5,192,117 | A | 3/1993 | Kuck | |

(Continued)

*Primary Examiner* — Thomas R Hannon
*Assistant Examiner* — Phillip A Johnson
(74) *Attorney, Agent, or Firm* — McHale & Slavin, P.A.

(57) ABSTRACT

A system for pressurizing a hub having a bearing chamber formed from an air-tight sealing arrangement located on each end of a hub to form a closed air system in the interior of the hub or in combination with a second hub. The closed air system fluidly coupled to a pressurized air tank for receiving pressurized air. A pressure gauge provides a visual indication of the air pressure in the closed air system whereby a breached seal condition within the hub can be detected.

11 Claims, 3 Drawing Sheets

U.S. PATENT DOCUMENTS

| | | | | |
|---|---|---|---|---|
| 5,203,391 | A | | 4/1993 | Fox |
| 5,221,381 | A | | 6/1993 | Hurrell, II |
| 5,236,028 | A | | 8/1993 | Goodell et al. |
| 5,287,906 | A | | 2/1994 | Stech |
| 5,328,005 | A | | 7/1994 | VanBreemen |
| 5,429,167 | A | | 7/1995 | Jensen |
| 5,453,069 | A | * | 9/1995 | Snyder et al. .................... 492/5 |
| 5,482,358 | A | | 1/1996 | Kuck |
| 5,492,393 | A | | 2/1996 | Peisker et al. |
| 5,535,516 | A | | 7/1996 | Goodell et al. |
| 5,591,281 | A | | 1/1997 | Loewe |
| 5,709,389 | A | | 1/1998 | Algers et al. |
| 5,785,390 | A | | 7/1998 | Gold et al. |
| 5,979,232 | A | | 11/1999 | Halcomb |
| 5,983,728 | A | | 11/1999 | Weng |
| 6,024,417 | A | | 2/2000 | Jones et al. |
| 6,123,175 | A | | 9/2000 | Fett |
| 6,129,017 | A | * | 10/2000 | Mohrmann et al. .......... 101/376 |
| 6,260,595 | B1 | | 7/2001 | Cobb |
| 6,325,123 | B1 | | 12/2001 | Gao et al. |
| 6,325,463 | B1 | | 12/2001 | Sitter et al. |
| 6,488,342 | B1 | | 12/2002 | DePaiva |
| 6,758,531 | B1 | | 7/2004 | Bullard |
| 6,782,740 | B2 | | 8/2004 | Wallach |
| 6,795,753 | B2 | | 9/2004 | Vanderhoof |
| 7,125,084 | B2 | | 10/2006 | Dombrowski |
| 7,226,133 | B2 | | 6/2007 | Dombroski |
| 2002/0139288 | A1 | | 10/2002 | Evans et al. |
| 2003/0024463 | A1 | | 2/2003 | Evans et al. |
| 2004/0160115 | A1 | | 8/2004 | Allsop |
| 2004/0169416 | A1 | | 9/2004 | Dombroski et al. |

* cited by examiner

PRESSURIZED HUB SYSTEM

RELATED APPLICATIONS

This Application is a CIP of U.S. patent application Ser. No. 11/735,131 filed Apr. 13, 2007 now U.S. Pat. No. 7,740,036; which is a CIP of U.S. patent application Ser. No. 10/699,565 filed Oct. 30, 2003 (issued as U.S. Pat. No. 7,226,133); which is a CIP of U.S. patent application Ser. No. 10/376,756 filed Feb. 28, 2003 (issued as U.S. Pat. No. 7,125,084).

FIELD OF THE INVENTION

This invention is related to the field of bearing protection and, in particular, to a system that permits the pressurization of a bearing chamber used in an industrial application to provide bearing chamber integrity, as well as provide visual and/or audible indication of bearing chamber integrity.

BACKGROUND OF THE INVENTION

The instant invention is an apparatus and method for maintaining bearing chamber integrity in structures commonly referred to as a hub. Of particular concern is the hubs found in most industrial machines used in pulverizing, grinding, sanding, deburring, grinding, polishing, or the like applications where the hub may be subjected to an adverse environment. Such hubs are subjected to an environment of water, lubricating oil, grinding dirt and dust which might be microscopic, or most any other abrasive material that is used in the process. The environment surrounding the hub can result in premature wear of metals due to the abrasive nature but is especially problematic to bearings once the abrasive materials contact the bearing. The same abrasive material that is used in the particular grindings, polishing or the like process can quickly destroy the bearings once the abrasive materials come in contact with the bearings.

The hub, as used throughout this disclosure, includes a bearing chamber that has roller bearings, races of the like assemblies to allow free rotation of the hub assembly in relation to the axle. As with any friction producing components, it is imperative that the bearings are lubricated in order to prevent premature wear. Typically, grease is used which liquefies during hub rotation for use in lubricating the bearings. The grease is sealed within the bearing chamber by use of a seals positioned along an inner side surface of the hub, and a bearing cap positioned along an outer side surface of the hub. The seals are used to prevent liquified grease from escaping the hub joint.

The integrity of the seals is critical to prevent loss of grease. Absence of a lubricant can quickly lead to catastrophic failure of the bearings causing hub disengagement of the axle, which can result in assembly loss and the associated dangerous scenario of property damage. For instance, a grinding device that fails can quickly damage the item being worked upon beyond salvage, damage the sanding grinding belts beyond salvage, place the operator at risk, and result in downtime for repair of the equipment.

A bearing that is used in grinding can carry a heavy load which will quickly heat up a bearing that is not properly lubricated. Should the bearing fail, the bearing and race will typically disintegrate with a likely result of the hub detaching from the axle. In certain operations, the bearing may be subject to external pressures that may include air, water, or lubrication fluid pressure. Should there be a failure of the hub seal, the pressured air or fluid is then forced into the hub carrying with it the materials removed during the grinding operation, the ideal material for immediate destruction of the bearings. In addition, should the materials that enter the hub include moisture, bearing disintegration is greatly enhanced since rust forming on the axles surface will operate to destroy the replacement bearings with very short use.

In light of the above numerous attempts have been made in order to prevent loss of bearing lubricant. Many prior art hub devices are designed to maintain a pressurized grease within the hub. U.S. Pat. No. 4,524,917 discloses the use of bearing assembly that operates under pressure to form air seals to keep out dust and abrasive material. However, the teaching is to place the air to the outside of the seals in an effort to push contaminants away from the seal. The disclosure maintains the use of a pressurize oil lubricant for the bearings.

U.S. Pat. No. 3,609,066 discloses the use of a lubricant pump to supply pressurized lubricant to bearings.

U.S. Pat. No. 4,981,182 discloses a sealed rotary drill bit having an inner seal and an outer seal with a circumferential seal gap there between which is filed with a lubricant. Pressurized gas is carried by passageways pass through a restrictor that has a controlled dissipation to wash away drilling debris.

Current pressurized systems can result in an excess amount of lubricant being injected into the hub which results in a waste of lubricant should a leak occur. A leaking seal can cause the entire work area to become contaminated and the lubricant can contaminate the work product. In a conventional lubricant pressurized system, lubricant may be pumped in on a continuous basis with the lubricant leaking through the seal breach. In a conventional non-pressurized system, lubricant may be pumped in only when the operator deems it necessary. For instance, an operator may check a hub before starting a work project and insert grease into the hub. Once the hub reaches its operating speed, the grease liquefies and may easily escape a breached seal. Should the operator introduce a cooling liquid, the lubricant may be drawn through the seal with the uneven temperatures and the cooling liquid can be contaminated.

The environmental impact of disposing a contaminated lubricant is well known. The operator must clean the cooling liquid of the lubricant for the expulsion of grease into a conventional drain that will have a cumulative negative impact on the environment. Should the water be expelled without cleaning, even a few drops of oil can result in extensive contamination.

Thus, what is lacking in the art is a pressurization system that verifies bearing chamber integrity.

SUMMARY OF THE INVENTION

Disclosed is an apparatus to provide a pressurized hub to provide a positive indication of bearing chamber integrity, provide an indication as to the presence of bearing lubricant within the hub, and prevent the release of bearing lubricant into the environment outside the bearing chamber. The applicant's system can be use to modify a conventional hub to provide an air-tight seal for receipt of pressurized air from a compressed air source. The compressed air provides continual hub, bearing chamber, pressurization despite temperature fluctuations. A pressure gauge can be mounted anywhere along the pressurized system providing a visual indication of the internal pressure and seal integrity.

It is an objective of the instant invention to provide a pressurization system for indicating bearing chamber integrity for hub assemblies used on commercial and industrial equipment in abrasive and corrosive environments.

Another objective of the instant invention to provide a apparatus for maintaining a predetermined amount of pressurized air in a hub assembly and to automatically adjust for fluctuations in pressure caused by temperature variations.

Still another objective of the instant invention is to provide a visual and/or audible indicator for shop personnel that hub integrity is intact thereby indicating proper lubrication in an environment that might otherwise be obscured due to the particular machining function.

Yet still another objective of the instant invention is to provide a positive pressure within a bearing chamber at all times to prevent the entrance of particles within the chamber including water thereby preventing premature destruction of the bearing assemblies.

In accordance with the above objectives, a pressurization system for hubs is provided utilizing compressed air having a pressure switch for use in series with a relief valve to prevent over-pressurization. The pressurization system is coupled to a hub having a bearing chamber that is rotatably securable to an axle; seals between the hub and the axle, the seals forming a closed air space around the bearings.

The hub comprises a sealing arrangement that provides an air-tight sealing arrangement for the bearings of a hub to form a closed air system. An aperture is formed through the axle to provide an air flow connection with a remotely mounted air compressor used to pressurize the closed air space. An air pressure gauge provides a visual indication of the level of air pressure in the closed air system whereby a breached seal condition within the hub can be detected by the inability to maintain a properly pressurized system. A hub cap may also be used to provide a seal wherein the degradation of the hub bearing outer seal will not result in air loss or grease leakage.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

Figure 1:
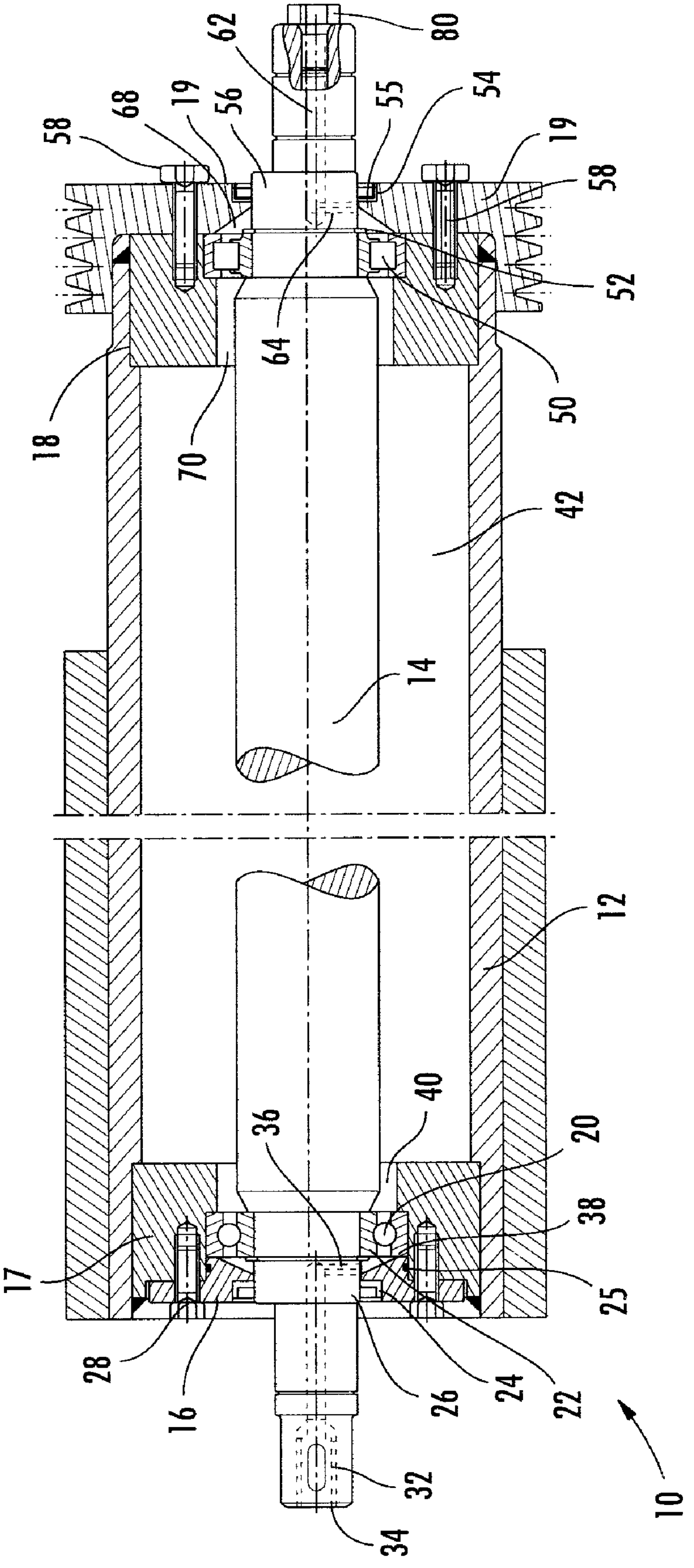
FIG. 1 is a cross-sectional view of a pressurized hub shown mounted on a roller assembly.

FIG. 1 is a cross-sectional side view of a roller assembly 10 having a roller shell 12 with an axle 14 extending therethrough. The axle is rotatably supported by a first and second hub 17, 18. First hub 17 has a bearing 20 operatively associated with a bearing race 22. A modified seal 24 is used in conjunction with a stainless steel bushing 26, the combination capable of preventing air from passing. The stainless steel bushing 26 is secured to the axle with a bonding agent thereby eliminating the need for polishing of the axle and allowing for retrofit of existing systems that may have axle corrosion. An O-ring 25 may be positioned beneath the bearing so that a fully air tight seal can be achieved without bonding or the use of a liquid seal, thus creating a closed air system. The end caps have silicon sealant on the inside of the end cap and the outside of the roller where they are bolted together. The end cap 16 is secured to the hub 17 by use of mounting bolts 28. The axle 14 has an aperture 32 extending along a longitudinal length of the axle with a cross aperture 36 allowing pressured air to be delivered through the aperture and into a outboard chamber 38, inboard chamber 40, and roller chamber 42. Chambers 38 and 40 may be isolated from roller chamber 42 wherein lubrication is maintained within the hub only, without excess lubrication being placed in the roller chamber. Such installations would be used in instances where the hub is rotated at right rpm's which may cause liquefying of the lubricant. In lower speed operations, packing of the bearings is sufficient and the roller chamber can be coupled with the hub chambers.

Second hub 17 has a bearing 50 operatively associated with a bearing race 52. A modified oil seal 54 operates in conjunction with a stainless steel bushing 56, the combination is capable of preventing air from passing. The stainless steel bushing 56 is secured to the axle 14 with a bonding agent, not shown. The end cap in this embodiment is a belt housing end cap 19, the bushing is mounted with the flange facing outwards, silicon sealant, not shown, is on the inside of the end cap 19 and the outside of the roller where they bolt together. The end cap 18 is secured to the hub 18 by use of mounting bolts 58. The axle 14 has an aperture 62 extending along a longitudinal length of the axle 14 with a cross aperture 64 allowing pressured air delivered through the aperture to into a outboard chamber 68, inboard chamber 70, and roller chamber 42. Chambers 38 and 40 may be isolated from roller chamber 42 in a conventional hub wherein lubrication is maintained within the hub only, without excess lubrication being placed in the roller chamber. In this embodiment, all chamber are fluidly connected thus an end plug 80 may be used to plug the aperture if drilled.

The hub is pressurized by use of compressed air, found in most any industrial plant. Alternatively a small air compressor, not shown, can be employed if a self contained pressurized system is desired. The air compressor is capable of maintaining a predetermined pressure in the chambers which is now a closed air space, typically between 1 psi and 30 psi. The actual pressure is determined by the type of seals to be employed since certain seals cannot handle the higher pressures. In the preferred embodiment, the air compressor will automatically compensate for differing loading characteristics which can change the pressure reading of the hub. For instance, if the hub is filled to 30 psi, operating the rollers at high rpm's will have a tendency to warm the air within the hub assembly and increase air pressure. Similarly, should the hub assembly be subjected to very cold temperatures, such as when the hub assembly is water or air cooled, the pressure can be changed.

The end plug 80 may be replaced by a pressure gauge, not shown, to provide a location for a specific visual indicator of seal integrity. An air gauge may also be remotely mounted by directly coupling into an air line.

Figure 2:
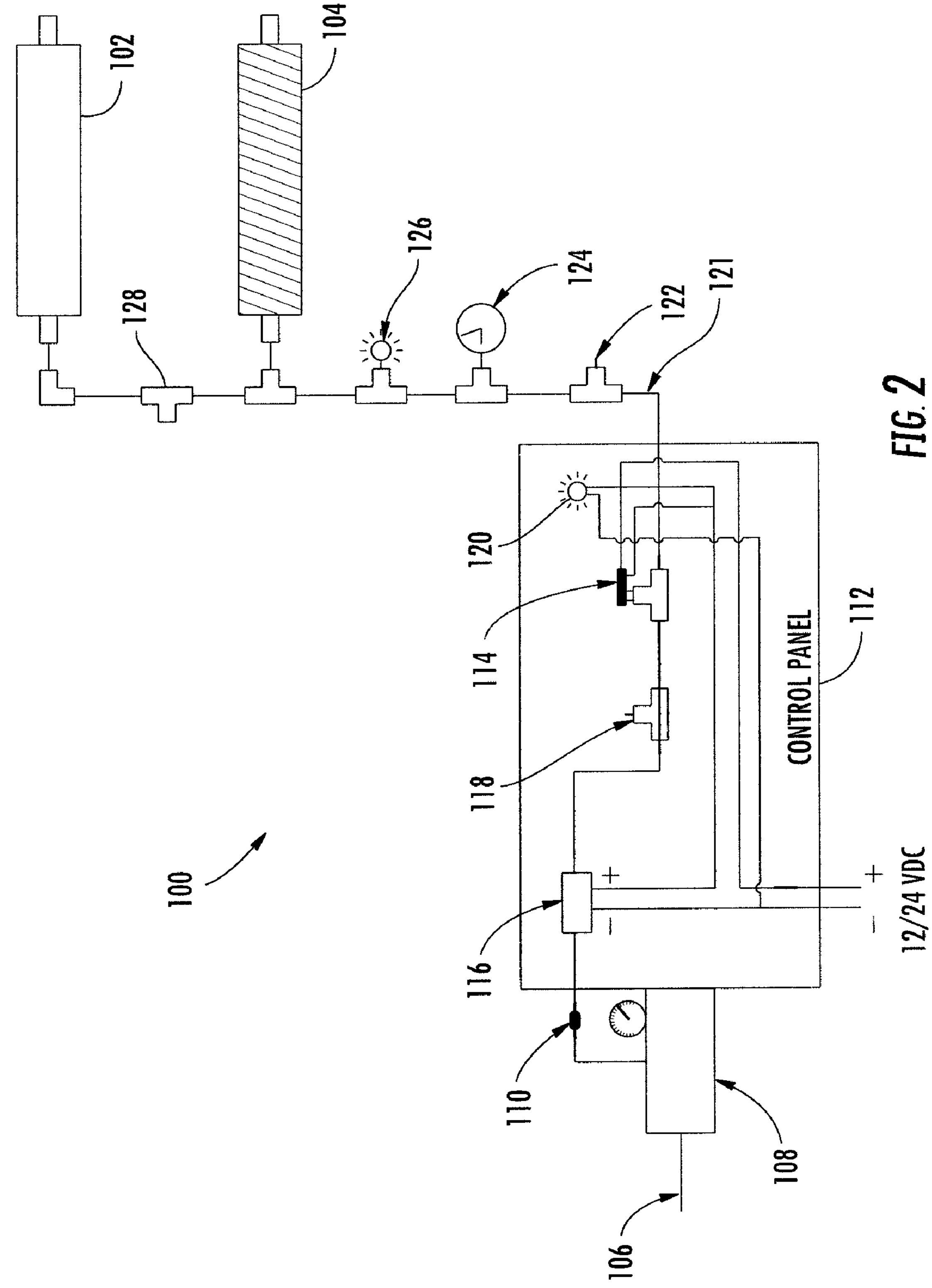
FIG. 2 is a flow diagram of an air-compressor based pressurization system.

An air pressure gauge of a conventional design would include a dial in the form of an annular disk having the standard numeric indicia thereon in the form of radial graduations. A pressure indicating needle moves relative to the annular disk in direct relation to the air pressure within the hub. The disk can also include alphanumeric indicia specific to the function of the present invention corresponding to the position of pressure indicator needle. For example, the disk can indicate an optimum air pressure fill level, and can include color coded regions to alert observers that the seal has been breached. For instance, a gauge indicator could show green if the hub integrity is proper, or red is no pressure is available so as to indicate seal breach Now referring to FIG. 2 set forth is flow diagram of pressurization system 100 for use with a pressurized hub (rollers) 102, 104. The system 100 consists of an air source 106 that is preferably coupled to an air tank 108 to prevent compressor cycling. In this embodiment an air regulator 110 is set for a low pressure installation of 10 psi. The air regulator 110 may include a filter, may be adjustable, or may be fixed with an emergency relief valve. A control panel 112 is provided for ease of installation and includes an electric pressure switch 114 for control of solenoid valve 116. In this embodiment the switch 114 turns on at 7 psi and off at 10 psi for controlling the electrically operated solenoid valve 116 directing the air through a pressure relief valve 118 which is set at 15 psi and may provide redundant back-up to the air regulator 110. As the operation of this device is typically in an industrial application, the use of a visual indicator 120 provides a light indication that the bearing chamber integrity may be in breach. The indicator may also be an audible indicator in those instances where an alarm function may be heard.

From the control panel 112 the pressurized air produced may be directed to the hubs by low pressure tubing 121 such as polyethylene tubing. An in-line shut off valve 122 allows maintenance of the hubs without disabling of the air compressors. A pressure gauge 124 and audible and/or visible low pressure indicator 126 provides localized visualization of the bearing chamber integrity. As previously mentioned, a pressure gauge may also be mounted directly to the hub if convenient to the operator. The system can provide protection to an unlimited number of hubs by simply adding connections 128 within the piping system.

Figure 3:
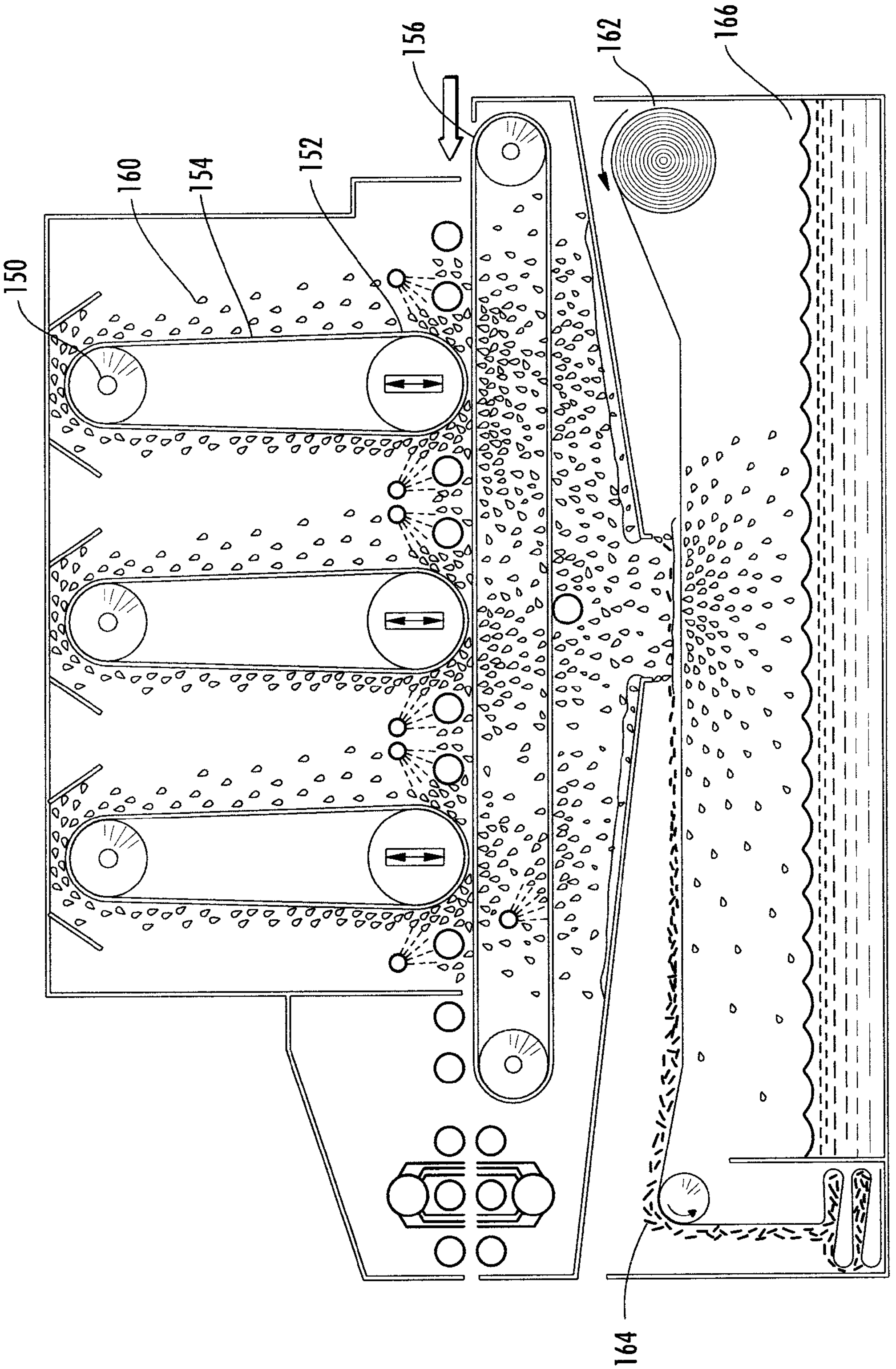
FIG. 3 is a cross sectional pictorial of an industrial polisher, grinding, and deburring with liquid cooling/waste material collection.

FIG. 3 is a cross sectional pictorial view depicting an industrial polishing unit have upper rollers 150, lower rollers 152 and a polishing belt 154 placed there between. The polishing belt 154 is a continuous belt with work pieces carried along the conveyor belt 156. As illustrated, the upper and lower rollers are placed in an environment having a continual bath of fluid 160 for use in cooling and waste material transfer. Excess waste 164 is collected on a drape 162 with the filtered water 166 available for recycling. In operation the filtered water remains loaded with waste material that passed through the filter, the smaller material is even better suited for breaching of a seals used in a conventional system for protecting of the bearing.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings. The instant invention can be used on any type of industrial equipment where integrity of the bearing housing is critical. It should be noted that proper seals also prevents grit, wood dust, or any other water or airborne contaminants from entering the bearing housing thereby enhancing bearing life.

What is claimed is:

1. A pressurized hub system comprising: a pressure switch and solenoid valve for controlling pressurized air; a first hub having bearings that are rotatably securable to an axle with air tight seals between said first hub and said axle, a second hub having bearing that are rotatably securable to said axle with air tight seals between said second hub and said axle, said seals forming a closed air space between said first and second hubs; and a pneumatic chamber in at least one said hub which is coaxially disposed within said axle having an inlet adapted for fluidly coupling to said pressurized air and an outlet coupled to said closed air space, a source of pressurized air maintaining between 1 psi and 30 psi in said closed air space.

2. A pressurized hub system according to claim 1 wherein said pressure switch allows the introduction of pressurized air into said closed air space when said pressurized air is less than about 7 psi.

3. A pressurized hub system according to claim 1 wherein said pressure switch discontinues a flow of said pressurized air greater than about 10 psi.

4. A pressurized hub system according to claim 1 including a visual indicator for verifying closed air space integrity.

5. A pressurized hub system according to claim 1 including an audible indicator for verifying closed air space integrity.

6. A pressurized hub system for use with industrial rollers comprising: at least one cylindrical shaped roller housing having an axle extending therethrough, said roller having a proximal end with a first hub secured thereto and a distal end with a second hub secured thereto; a bearing assembly positioned within each said hub that is rotatably securable to said axle; a seal assembly positioned between each hub and said axle, said seal assembly forming a closed air space between said first and second hubs; and a pneumatic chamber in at least one end of said axial having an inlet adapted for fluidly coupling to a source of pressurized air and an outlet coupled to said closed air space.

7. A pressurized hub system according to claim 6 wherein said seal assembly is constructed and arranged to maintain between 1 psi and 30 psi in said closed air space.

8. A pressurized hub system according to claim 6 including a control panel having a pressure switch and solenoid valve for controlling pressurized air; wherein said pressure switch allows the introduction of pressurized air into said closed air space when said pressurized air is less than about 7 psi.

9. A pressurized hub system according to claim 8 wherein said pressure switch discontinues a flow of said pressurized air greater than about 10 psi.

10. A pressurized hub system according to claim 6 including a visual indicator for verifying closed air space integrity.

11. A pressurized hub system according to claim 6 including an audible indicator for verifying closed air space integrity.

* * * * *